Figure 1:
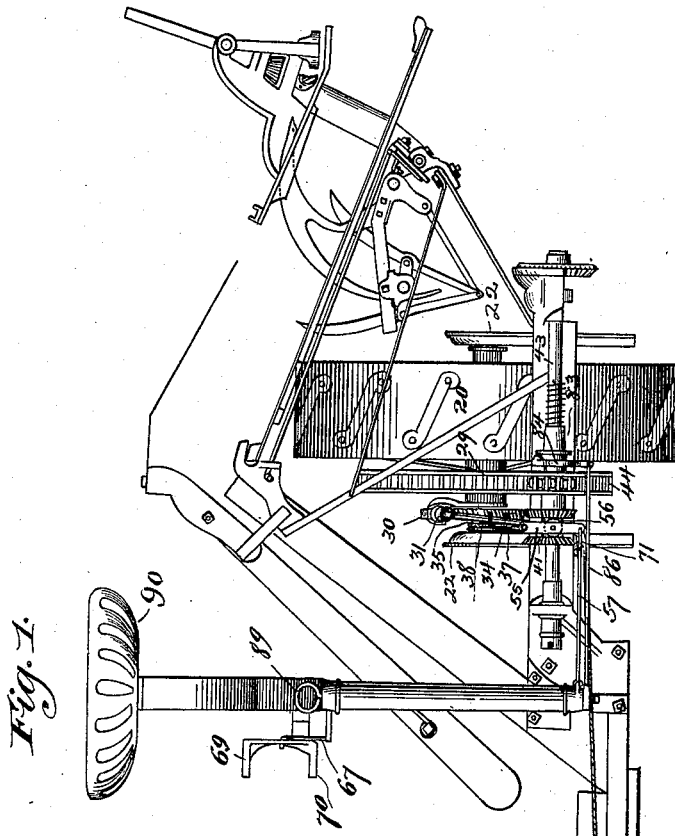

(No Model.)

J. F. APPLEBY.
HARVESTER.

No. 601,866. Patented Apr. 5, 1898.

Witnesses,

Inventor,
John F. Appleby (No Model.) J. F. APPLEBY. 7 Sheets—Sheet 3.
HARVESTER.

No. 601,866. Patented Apr. 5, 1898.

Witnesses,
Inventor,
John F. Appleby
By Offield, Towle & Linthicum,
Attys.

(No Model.)   J. F. APPLEBY.   7 Sheets—Sheet 4.
HARVESTER.

No. 601,866.   Patented Apr. 5, 1898.

(No Model.) 7 Sheets—Sheet 5.
J. F. APPLEBY.
HARVESTER.
No. 601,866. Patented Apr. 5, 1898.
Fig. 5.
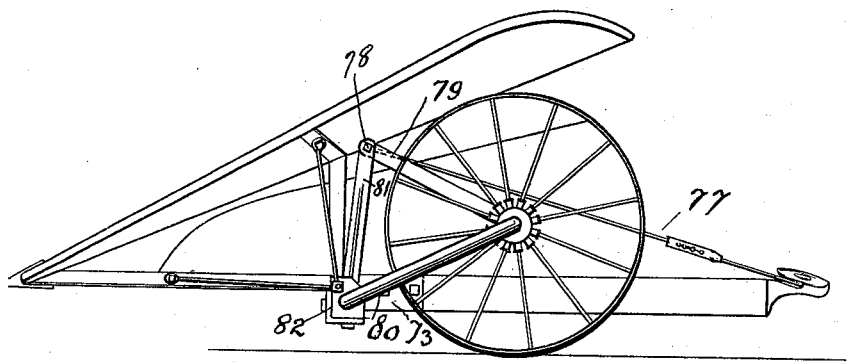
Fig. 12.
Fig. 13.
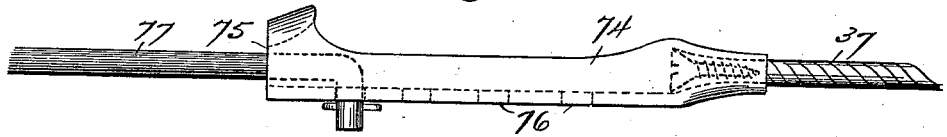
Fig. 14. Fig. 15.
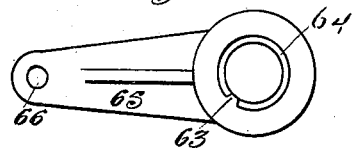 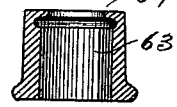
Fig. 16.
Witnesses,
F. S. Mann
F. C. Goodwin
Inventor,
John F. Appleby
By Offield, Towle & Linthicum
Attys.

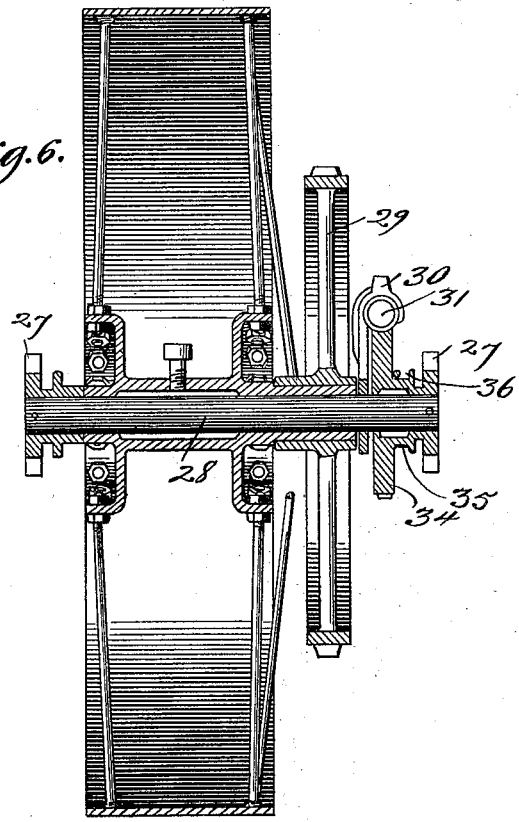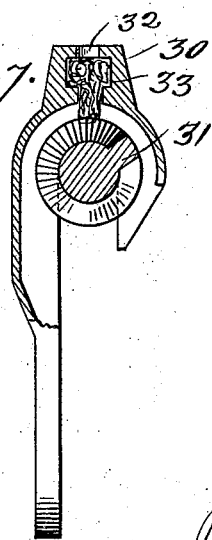

(No Model.) 7 Sheets—Sheet 7.
J. F. APPLEBY.
HARVESTER.
No. 601,866. Patented Apr. 5, 1898.
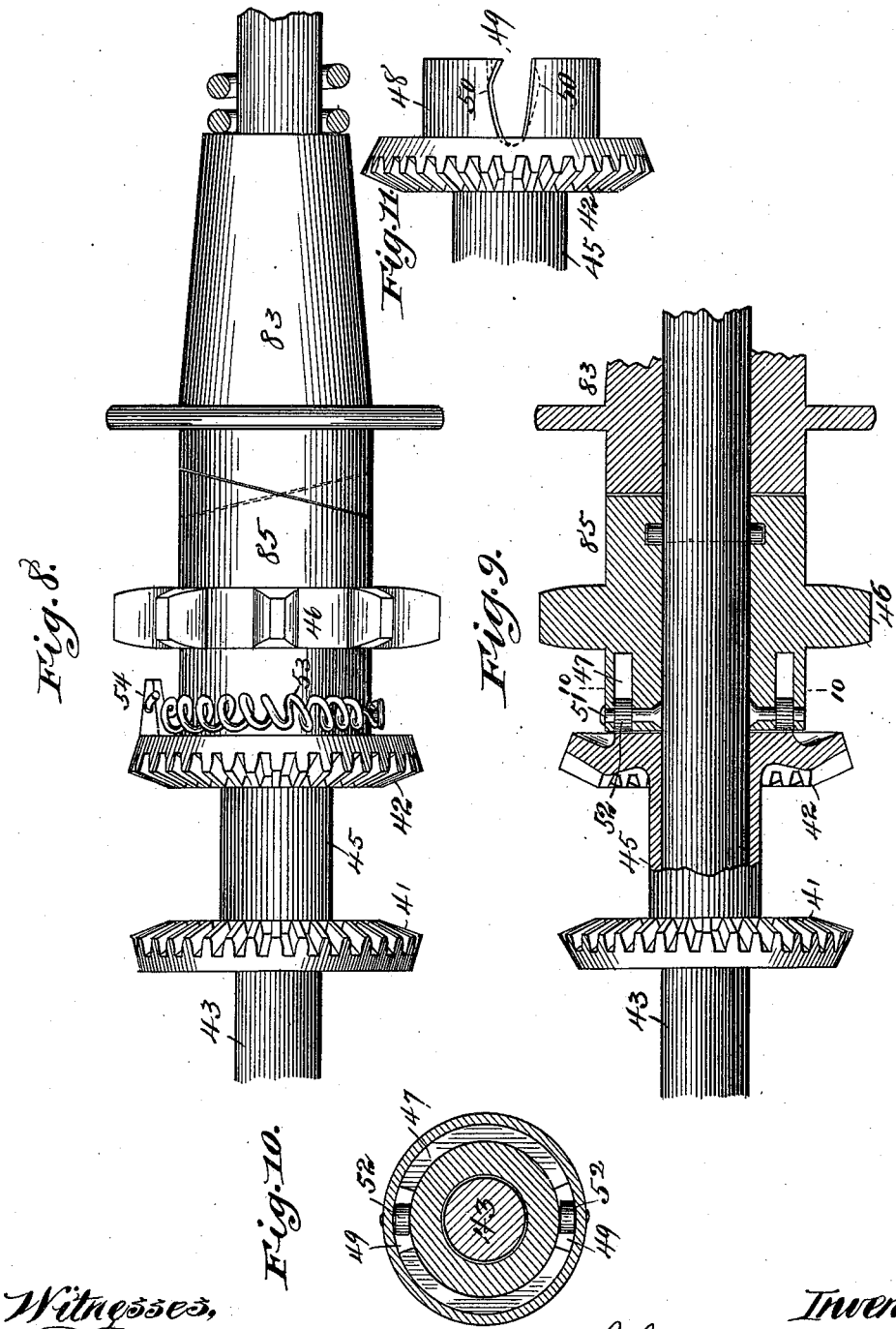

UNITED STATES PATENT OFFICE.

JOHN F. APPLEBY, OF CHICAGO, ILLINOIS, ASSIGNOR, BY MESNE ASSIGNMENTS, TO DAVID KELLY, OF SAME PLACE.

HARVESTER.

SPECIFICATION forming part of Letters Patent No. 601,866, dated April 5, 1898.

Application filed March 4, 1895. Serial No. 540,429. (No model.)

*To all whom it may concern:*

Be it known that I, JOHN F. APPLEBY, of Chicago, Illinois, have invented certain new and useful Improvements in Harvesters, of which the following is a specification.

This invention relates to means for raising and lowering bodily a harvesting-machine to adapt it to cut different heights of stubble; and the invention consists in certain novel features, which will be hereinafter described, and particularly pointed out in the claims.

In the accompanying drawings I have shown my invention as applied to a self-binder; but it will be understood that the same construction might be applied to a self-raker or other type of harvesting-machine. As shown in the drawings, the harvester is balanced upon a large ground-wheel from which the motive power for the gearing is derived, while the outer end of the platform is carried by a grain-wheel, and the bodily adjustment of the machine and platform is made with reference to these two wheels. To this end a shaft passes loosely through the hub of the main drive-wheel and the latter turns on said shaft. Worm-gearing is applied to said shaft whereby it can be rotated in either direction, and said shaft has gear-wheels which work upon racks carried by the framework of the machine, and thereby operate to raise or lower said framework with the binder and adjacent mechanism bodily. By the rotation of the same shaft the outer end of the platform is raised or lowered through the instrumentality of a cable, one end of which is made fast with and adapted to wind about such shaft or a drum thereon, while the opposite end of the cable is connected to a crank-axle on which the grain-wheel is mounted. The gearing is controllable from the driver's seat, so that by manipulating the foot-pedal the driver may put such gear in train with the main driving-shaft of the machine, and thereby apply the motive power to the raising and lowering of the machine.

Figure 2:
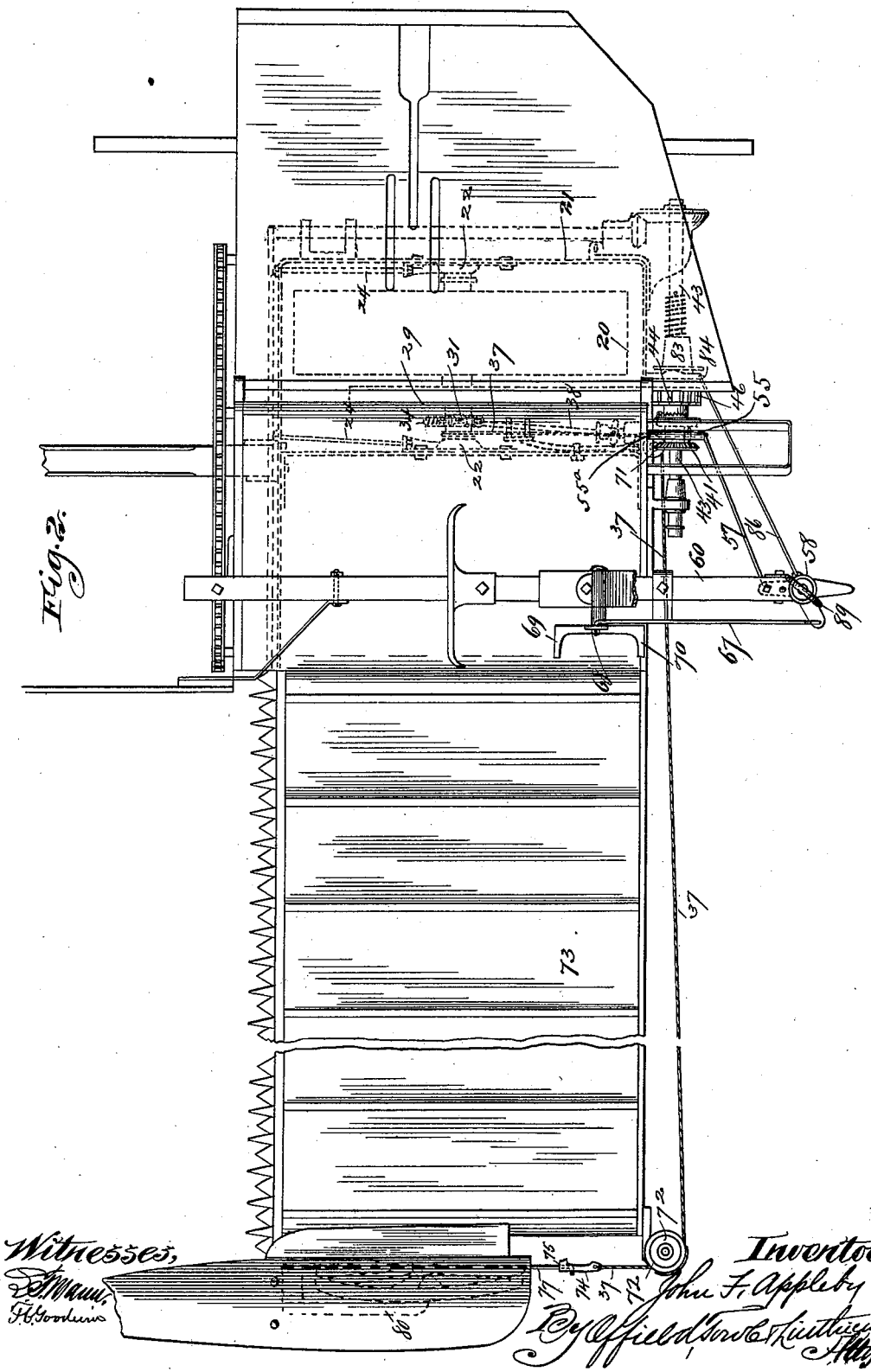
Figure 3:
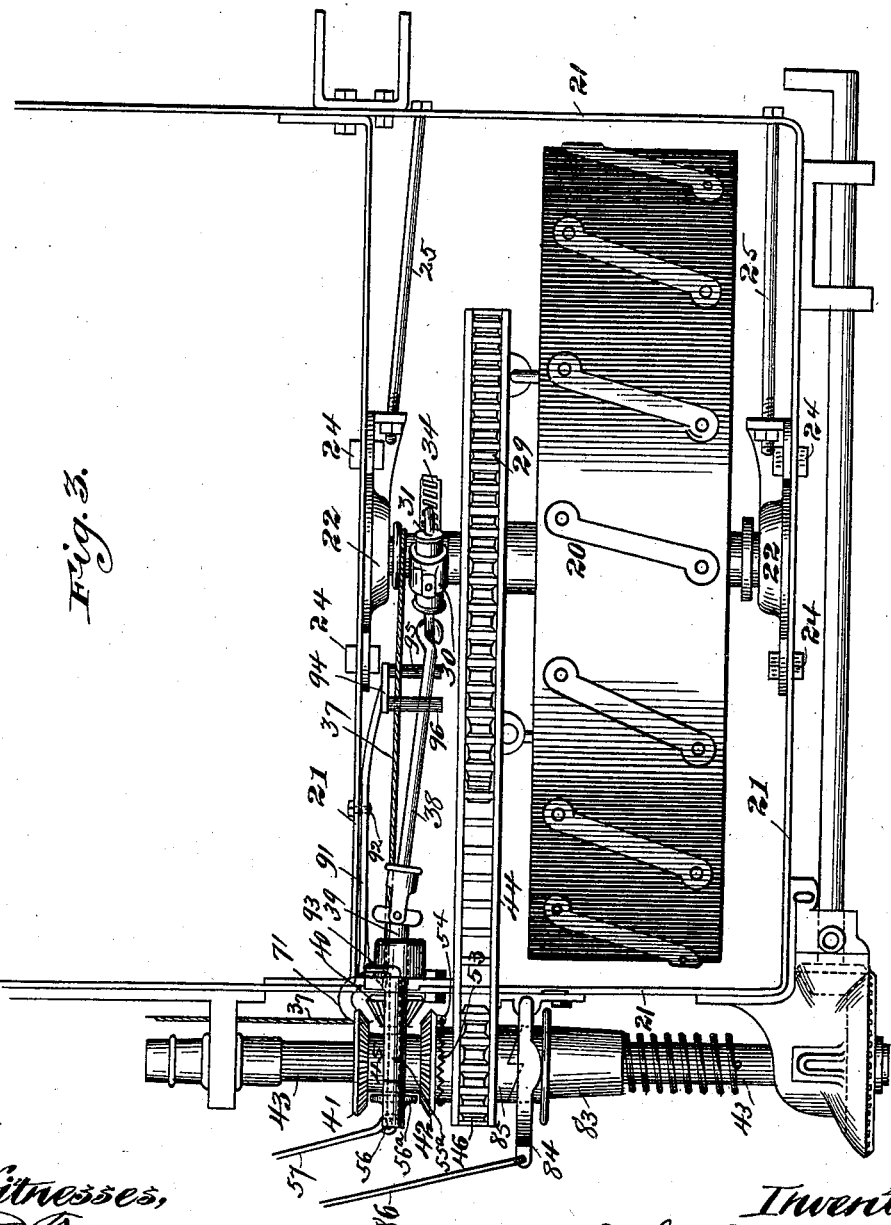

In the drawings, Figure 1 is a rear elevation of a self-binder embodying my improvements. Fig. 2 is a plan view of the same. Fig. 3 is a plan view of the framework of the binder, showing its relation to the framework of the machine, which is carried by the main ground-wheel. Fig. 4 is an elevation from the binder side, but with the binder and other parts omitted. Fig. 5 is an elevation of the outer end of the grain-platform, showing its carrying-wheel, crank-axle, and operating-cable. Fig. 6 is a cross-section through the hub of the ground-wheel, showing its shaft in elevation and the gearing mounted thereon in section. Fig. 7 is a detail view showing a worm-shaft in cross-section with its bearings and means for lubricating it. Figs. 8 to 11, inclusive, are detail views showing the main driving-shaft broken away with a clutch mechanism applied thereto and employed for controlling the gearing. Figs. 12 and 13 are details of the mechanism for rocking the crank-axle of the grain-wheel. Figs. 14 and 15 are detail views of a crank which is employed in connection with the gear-shifting mechanism. Fig. 16 is a detail of a pipe-section on which said crank is fitted.

In the drawings, 20 represents the ground-wheel, on which is suspended the frame 21, the outlines of which are shown in Figs. 3 and 4.

22 represents brackets which are adjustably secured upon members 21 of the frame by means of the bolts 23 and nuts 24, the bolts preferably working in slots in the frame, so as to admit of sufficient adjustment of the brackets laterally to secure vertical alinement. Such adjustment may be accomplished by means of the bolts or adjusting-rods 25. The brackets have integrally formed therewith the vertical racks 26, with which are enmeshed the gears 27, secured on opposite ends of a short axle 28, the latter passing freely through the hub of the ground-wheel.

29 represents the main driving-gear, which is secured to the ground-wheel.

30 is a bracket (shown in detail in Fig. 7) affording a bearing for a short worm-shaft 31. The bearing has a lubricant-chamber 32, filled with waste (indicated at 33) and adapted to constantly supply a lubricant to the worm.

34 represents a worm-wheel which may be formed integrally with one of the gears 27, said gears being pinned or otherwise secured on the shaft 28. The hub of the worm-gear is extended to afford a drum 35, with a flange 36, and to which is made fast one end of a cable 37. The worm 31 is connected by a tumbling-rod 38 to a short shaft 39, having a bevel-gear 40, flanked by two bevel-pinions 41 42, mounted on the driving-shaft 43. A link-belt 44 transmits motion from the main driving-gear 29 to said shaft 43. The pinions 41 and 44 are for convenience integrally connected by means of the sleeve 45, through which the main driving-shaft passes. The pinions are thus adapted to be shifted laterally upon said shaft; but they are secured to rotate constantly thereon by being engaged with a sprocket-gear 46, over which the chain 44 is carried. Said sprocket-gear has upon one side an extended hub provided with an annular socket 47, in which an annular flange 48, formed on the face of the bevel-pinion 42, projects. Said flange 48 has at opposite points the irregularly-formed cam-grooves 49, provided with a seat 50 therein. Pins 51 pass through the wall of the socketed hub and carry antifriction-rollers 52, which work in the cam-slots 49. A spring 53, connected at one end to a lug 54 on pinion 42 and at the other to the socketed hub, normally tends to hold the antifriction-roller in the seat 50, and thereby maintains the bevel-gears 41 42 out of mesh with the pinion 40.

55 represents a rock-shaft having a bearing in a bracket 55ª and having a pendent arm or crank 56 secured in some suitable way thereon. The pendent arm 56 carries on its lower side a small roller 56ª, which is adapted to contact with the inner faces of the pinions, respectively, as the shaft is rocked. A rod 57, connected to the end of said arm, projects diagonally and rearwardly to the vicinity of the lower end of a tubular standard 58. Said standard is carried by a bracket 59, extending rearwardly from the frame, its upper end being supported by a brace 60. The space between the frame members 58 and 59 is thus left open for the passage of grain upwardly over the elevator to the binding-deck. The tubular standard 58 affords a support and bearings for the elements of the gear-shifting mechanism. One of said elements comprises a pipe-section 61. (Shown by dotted lines in Fig. 4 and in detail as to its upper end in Fig. 16.) Said pipe-section has a longitudinal slot 62 in its upper end and a similar slot in its lower end. Crank-arms are secured to this pipe-section at its upper and lower ends, said crank-arms being of similar construction and the form thereof being represented in Figs. 14 and 15. As there shown, it comprises a tubular head adapted to slip over the end of the pipe 61, said head being provided on its interior with a key 63, which enters the slot 62. This head has also a flange 64, which seats upon the end of the pipe.

65 is a crank-arm provided with an eye 66. The shifting rod 57 is connected to the crank-arm at the lower end of the tube 61, while the crank-arm at the top of the pipe is connected to a rod 67, extending to a foot-treadle pivoted at 68. Said treadle has two arms 69 70, the front arm being elevated above the rear arm and indicating by its position the direction of movement necessary to raise the machine.

The raising of the machine proper is effected through the instrumentality of the gears and racks above described, while the raising of the platform is effected by means of the cable 37, which is conducted around sheaves 71 72, the former being located in line with the drum, to which one end of the cable is made fast, and the sheave 72 being located at the outer corner of the platform 73. The cable is connected beyond the sheave 72 with a take-up device consisting of a casting 74, having an eye or opening 75 in its forward end and notches or apertures 76 in a marginal flange thereof. A rod 77 passes through the eye, and a bent end thereof enters one or the other of the apertures 76, according to the adjustment desired. The rod 77 is pivotally connected by a pivot-bolt 78 with the end of a lever 79, secured with the journal of the crank-axle 80 and also with the upper end of a standard 81, the lower end of which is secured in a casting 82, to which the outer end of the crank-axle arm 80 is likewise secured. The lever 79, crank 80, and standard 81 constitute a strong triangular frame, and the pull of the operating-cable is on the upper forward corner of such frame. Such pull will tend to rock the crank-axle, which is pivoted to the casting 82, the latter being secured to the platform-frame 73. The result of the pull, therefore, on the cable is to lift the outer end of the platform vertically, while the releasing of the cable permits the lowering of the outer end of the platform.

Referring to Fig. 3, it will be seen that the sliding clutch member 83, mounted on the main driving-shaft 43, is controlled by the shipper-fork 84 and normally thrust into engagement with a clutch member 85 on the hub of the sprocket-gear 46. The shipper-fork is operated by means of a rod 86, connected to a crank-arm 87, carried by a rod 88, extending through the pipe-section 61 and terminating in a handle 89. The driver's seat 90 is mounted directly above the tubular standard 58 and therefore the shifting mechanism is all within easy reach of the driver. The cutting mechanism of the machine may therefore be thrown into gear by simply turning the rod 88, while the releasing and lowering of the machine will be effected by pressure on one or the other of the arms of the foot-treadle.

Of course it will be understood that the particular arrangement of the gearing for controlling the cutting and binding of the grain may differ from that herein shown and described, and the arrangement thereof is claimed only so far as it enters into combination with the mechanism for raising and lowering the machine. I prefer the general arrangement shown, and particularly that arrangement whereby the support for the upright members or elements of the gear-shifting mechanism is located at sufficient distance in the rear of the platform to permit the free passage of the grain upwardly upon the elevator.

The principal feature of the invention consists in the means whereby the motive power of the machine may be utilized in raising or lowering it bodily and the operation of these means above described may be shortly stated as follows: If it be desired to raise the machine, the driver places his foot upon the high arm of the foot-treadle and rocking said treadle upon its pivot shifts the pinion 42, so that it will be thrown in mesh with the bevel-pinion 40. This will operate, through the tumbling-rod, worm-shaft, and worm-gear, to turn the axle 28, and by means of the gears 27, working in the racks 25 26, raise the frame bodily. The rotation of the axle will also cause the cable to wind upon the drum 35, thus operating through the crank-axle at the outer end of the platform to raise said platform. When it is desired to lower the machine bodily to adapt it to cut short grain or a low stubble, the driver depresses the low arm of the treadle, thus throwing the pinion 41 into mesh and turning the axle-shaft in the opposite direction, and thus lowering the machine bodily while unwinding the cable and permitting the outer end of the platform to simultaneously and correspondingly descend. This raising and lowering of the machine may be effected quickly with slight effort on the part of the driver and may be performed as the occasion requires in crossing the field. The range of movement may be varied. With the mechanism shown it can be one foot, more or less, which will be sufficient under all ordinary circumstances.

Obviously some of the structural features may be varied so long as the main idea of the invention is preserved—namely, to use the motive power in raising and lowering the machine.

In order to render the operation of the raising and lowering devices automatic to a certain extent, I have provided means whereby the gearing is shifted and the raising or lowering arrested at certain limits. Said means comprise the trip-arm 91, pivoted at 92 to the frame and loosely engaged at one end with short crank 93 on the rock-shaft 55. The opposite end of arm 91 has a cross-head 94, carrying pins 95 96, between which tumbling-rod 38 works. Now as the frame 21 rises or descends it will carry the one or the other of the pins 95 96 into contact with rod 38. This engagement will, upon the further movement, rock arm 91 on its pivot and through the short crank 93 rock shaft 55 in its bearing, swinging arm 56, and carrying roller 56ª out of contact with the bevel-pinion then engaged, and the raising or lowering will be arrested. The foregoing provision is intended to prevent accident in case the driver forgets or neglects to shift the gearing at the proper time.

I claim—

1. In a harvesting-machine, the combination with the ground-wheel and its axle loosely mounted therein and provided with gears affixed thereto, a main frame, racks rigidly secured therewith and enmeshed with the gears on the axle, a shaft having a sprocket-gear constantly driven from the main ground-wheel, two rigidly-connected pinions slidably mounted on said shaft, one of said pinions having an annular hub provided with cam-slots, said sprocket-gear having pins engaged in said cam-slots, a worm-shaft having a bevel-pinion arranged between said sliding pinions and a spring connecting one of said pinions and the sprocket-gear of the main shaft and normally tending to hold said pinions out of engagement with the bevel-pinion and worm-shaft, substantially as described.

2. In a harvesting-machine, the combination with the ground-wheel and its axle loosely mounted therein and provided with gears affixed thereto, a main frame, racks rigidly secured therewith and enmeshed with the gears on the axle, a shaft having a sprocket-gear constantly driven from the main ground-wheel, two rigidly-connected pinions slidably mounted on said shaft, one of said pinions having an annular hub provided with cam-slots, said sprocket-gear having pins carrying antifriction-rollers engaged in said cam-slots, a worm-shaft having a bevel-pinion arranged between said sliding pinions and a spring connecting one of said pinions and the sprocket-gear of the main shaft and normally tending to hold said pinions out of engagement with the bevel-pinion and worm-shaft, substantially as described.

3. The combination with gearing for vertically raising and lowering the frame and platform of a harvesting-machine, of a gear-shifting mechanism, a bracket projecting rearwardly from the frame of the machine and having a tubular standard, a pipe-section extending therethrough and having cranks on the ends thereof, a connection between one of said cranks and a shifting lever, a foot-treadle beneath the driver's platform and a connection between the other of said cranks and the treadle, substantially as described.

4. In a harvesting-machine, the combination with gearing for driving the cutting and binding mechanism and gearing for raising and lowering the main frame and platform, of a bracket extending rearwardly from the main frame, a frame member extending rearwardly over said bracket and having a driver's seat mounted thereon, a tubular standard rising from the bracket and to which the frame member is connected and gear-shifting mechanism, the controlling members whereof comprise a tube and a rod mounted to rock within the hollow of the standard, the rod passing through the tube and both having connections whereby they may be rocked by the driver from his seat, substantially as described.

JOHN F. APPLEBY.

Witnesses:
C. C. LINTHICUM,
N. M. BOND.